US005666124A

United States Patent [19]

Chethik et al.

[11] Patent Number: 5,666,124

[45] Date of Patent: Sep. 9, 1997

[54] HIGH GAIN ARRAY ANTENNA SYSTEM

[75] Inventors: Frank Chethik, Palo Alto; Bryan S. Costello, Cupertino, both of Calif.

[73] Assignee: Loral Aerospace Corp., New York, N.Y.

[21] Appl. No.: 572,763

[22] Filed: Dec. 14, 1995

[51] Int. Cl.$^{6}$ .................................. G01S 3/16; G01S 3/28

[52] U.S. Cl. .......................... 342/383; 342/380; 342/372; 342/442

[58] Field of Search ...................................... 342/380, 383, 342/372, 442

[56] References Cited

U.S. PATENT DOCUMENTS

| | | | |
|---|---|---|---|
| 3,623,094 | 11/1971 | Grabowski et al. . | |
| 4,268,829 | 5/1981 | Baurle et al. . | |
| 4,532,518 | 7/1985 | Gaglione et al. | 342/372 |
| 4,628,321 | 12/1986 | Martin | 342/379 |

*Primary Examiner*—Theodore M. Blum
*Attorney, Agent, or Firm*—Perman & Green, LLP

[57] ABSTRACT

A high gain Cassegrain reflector antenna system is disclosed for use in a RF signal receiving application. In one embodiment of the invention the antenna is a single parabolic reflector antenna having a plurality of feeds, while in another embodiment the RF signal is received by a number of parabolic reflector antennas. Each received RF signal component is separately amplified to produce corresponding individual amplified signals which are then summed to produce a summation signal. A phase difference between the summation signal and each individual amplified signal is determined, and each individual amplified signal is then phase adjusted until it is in a substantially coherent phase relationship with the summation signal. The phase adjustment compensates for phase displacement errors occurring due to, by example, an effective sector displacement error of a primary reflector of the Cassegrain antenna assembly. The phase adjustment may also compensate for phase displacement errors which result from an angular displacement of the received signal, such as that caused by atmospheric scintillation.

13 Claims, 5 Drawing Sheets

COHERENT PHASING OF THE OUTPUT OF THE ENSEMBLE OF FEEDS IS ACCOMPLISHED WITH THE PHASE CONTROL LOOPS.

CIRCULAR APERTURE ILLUMINATED IN 12 FOOT DIAMETER SECTORS

COHERENT PHASING OF THE OUTPUT OF THE ENSEMBLE OF FEEDS IS ACCOMPLISHED WITH THE PHASE CONTROL LOOPS.

HIGH GAIN ARRAY ANTENNA SYSTEM

FIELD OF THE INVENTION

This invention relates generally to antenna systems and, in particular, the invention relates to a high gain array antenna system.

BACKGROUND OF THE INVENTION

Traditionally, the achievement of antenna signal gains in excess of 70 dBi to 75 dBi has been unattainable for such typical antenna designs as the pyramidal horn, conical horn, and parabolic reflector antennas. This is due, at least in part, to efficiency degradations associated with surface precision limitations of these antennas, including phase errors occurring in the aperture field. Singly-fed parabolic reflector antennas whose diameters exceed approximately 1200 wavelengths, for example, have exhibited the highest gains for conventional antenna systems of this class, with gains ranging from approximately 65 dBi to 70 dBi.

OBJECTS OF THE INVENTION

It is thus an object of this invention to provide a high gain reflector-type antenna system which achieves a gain that exceeds 70 dBi, and that may realize an antenna gain as high as 90 dBi.

It is another object of this invention to provide a high gain Cassegrain reflector antenna system that is array fed.

It is another object of this invention to provide a high gain antenna system which reduces an effect of atmospheric scintillation on a received signal.

It is another object of this invention to provide a high gain antenna system having an array of nominally co-planar reflector antennas.

SUMMARY OF THE INVENTION

The foregoing and other problems are overcome and the objects of the invention are realized by a method, and apparatus for accomplishing the method, for achieving a high gain antenna for use in a signal receiving antenna system.

The method and apparatus operate by receiving signals from a plurality of consistent antennas or antenna segments amplifying each received signal, and summing all of the amplified received signals to produce a summation signal. A phase difference existing between the summation signal and each amplified received signal is determined. Amplified received signals are phase adjusted until they are in a substantially coherent phase relationship with the summation signal. When each amplified received signal is in a substantially coherent phase relationship with the summation signal, a maximum amplitude signal appears at a summation output.

In one embodiment of the invention, the antenna system receives signals via a Cassegrain reflector assembly. A received signal is reflected and amplified by surface portions, deemed sectors, of the Cassegrain reflector to a multi-element feed array. The multi-element feed array comprises individual feed array elements, each of which receives a portion of the RF signal reflecting from a surface of the Cassegrain reflector, and forwards the signals to a low loss combining network. The low loss combining network comprises a plurality of constituent signal paths, deemed phase correction loops. Each phase correction loop comprises an amplifier, phase shifter, filtering and gain device, coupler, and phase detector. The low noise amplifier amplifies a signal received from the output of a feed array element and forwards the amplified signal to a first input of the phase shifter. The phase shifter is a device for phase shifting a signal by an amount which is determined by a phase correction control signal applied at a second input of the phase shifter (to be described below). In practice, upon the initial application of the amplified signal to the phase shifter, the amplified signal may be arbitrarily phase shifted due to a possible random signal appearing at the second input of the phase shifter. After the amplified signal passes through the phase shifter, it is forwarded, via the coupler, to the phase detector and the summing network. The summing network sums each of the signals received from each one of the plurality of loops to generate a summation signal. The phase detector in each loop determines a phase difference existing between the summation signal and the signal forwarded to the phase detector by the phase shifter. The phase detector emits a phase correction control signal having a magnitude equal to the determined phase difference. The filter and gain device low-pass filters and amplifies the phase correction control signal and forwards the signal to the second input of the phase shifter. A signal received into each loop of the low loss network is then phase adjusted by the phase shifter by an amount equal to the magnitude of the phase correction signal. In this manner, each signal received into each loop is adjusted until it is in phase (phase coherent) with the summation signal. Each such signal is summed and a high gain coherently summed signal is provided to an output. The phase of this coherently summed signal is influenced by the phase of each of the phase shifted signals from each of the plurality of loops. Thus, as each signal received into each loop is phase adjusted in a manner as described above, the phase of the coherently summed signal correspondingly shifts. The rate of the phase shift of the summation signal relative to that of the signals being phase adjusted within each loop is small. In this manner, the individual phase control loops perform iterated phase corrections in a time-continuous fashion to achieve and maintain coherent phase summation of the signals from each of the plurality of loops. The phase adjustment compensates for phase displacement errors occurring due to, by example, an actual effective sector displacement error of the primary reflector of the Cassegrain antenna assembly.

The phase adjustment also compensates for phase displacement errors which may result from the possible angular displacement of a received signal. Such angular displacement can be caused by, for example, scintillation of the signal as it traverses the atmosphere. The scintillation phenomenon, which typically can alter the apparent arrival angle of the received signal within a few tens of milliseconds, is generally apparent in cases where the receiver antenna equivalent beamwidth is of an equal or a lesser magnitude than the angle subtended by the scintillation, and/or where the receiving antenna gain exceeds approximately 70 dBi. Due to the rapid angular displacement caused by scintillation, a typical singly-fed and mechanically steered parabolic antenna cannot react quickly enough to reposition itself in order to compensate for such an angle of arrival displacement. The active phase adjustments performed by the low loss combining network of the present invention, however, can so compensate. Thus, such phase adjustment compensation allows the antenna system to achieve a gain which is larger than that achieved by a traditional singly-fed Cassegrain or directly-illuminated parabolic antenna.

In another embodiment of the invention, the RF signal is received by a plurality of antennas, each of which in a preferred embodiment is a Cassegrain reflector antenna assembly. Also in the preferred embodiment, each of the plurality of antennas has high precision and efficiency, and is mounted on a common, nominally co-planar surface. Each antenna receives a portion of the RF signal, amplifies the portion, and forwards it to the low loss combining network. The low loss combining network performs a phase adjustment and a coherent summation of each amplified signal portion in a manner that is similar to that described above for the first embodiment.

BRIEF DESCRIPTION OF THE DRAWINGS

The above set forth and other features of the invention are made more apparent in the ensuing Detailed Description of the Invention when read in conjunction with the attached Drawings, wherein:

FIG. 1C also shows the manner in which a signal is received by the feed array elements and is forwarded to the low loss combining network.

FIG. 3 also illustrates a side view of the plurality of Cassegrain reflector assemblies and a coherent summation network.

DETAILED DESCRIPTION OF THE INVENTION

Figure 1A:
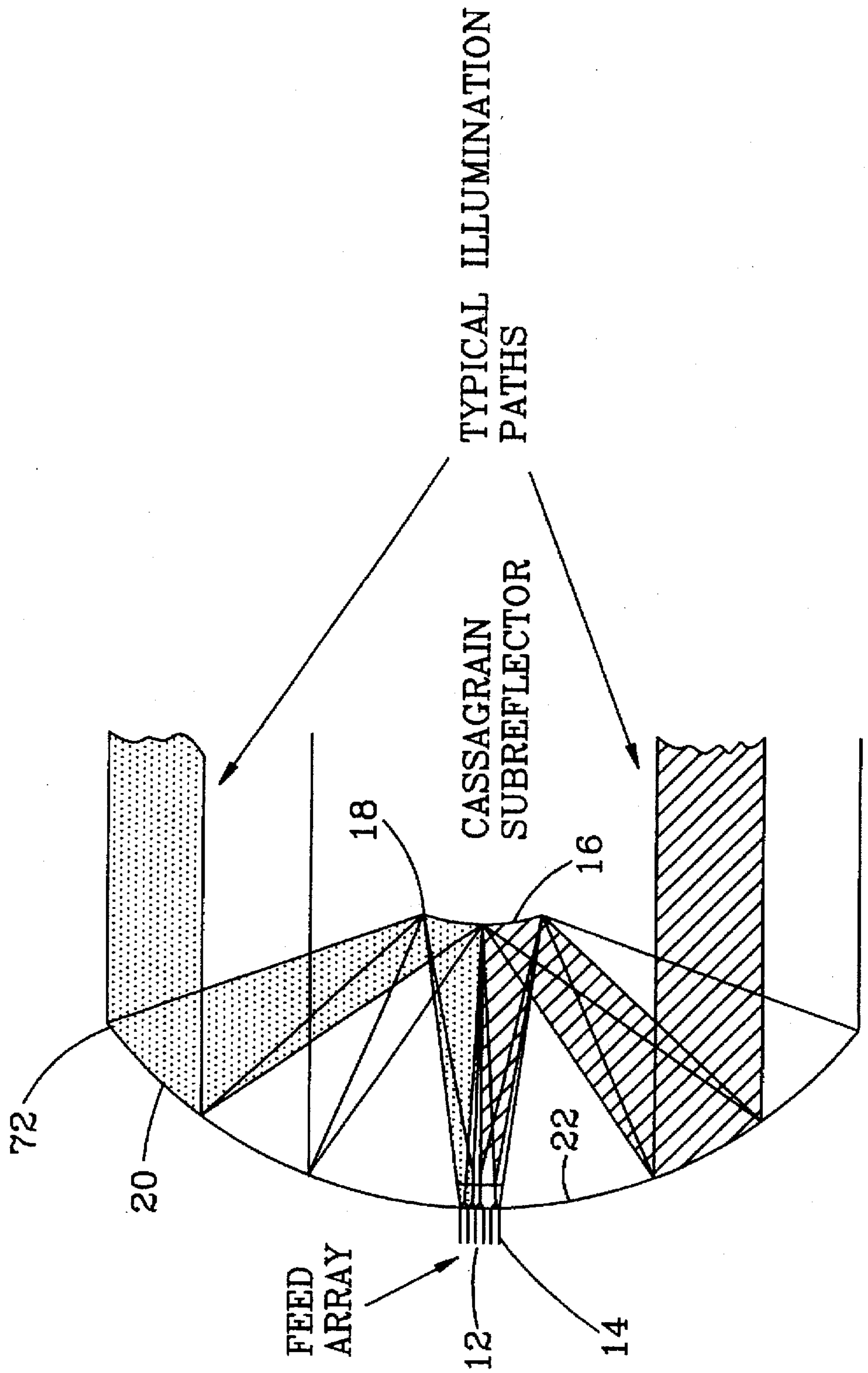
FIG. 1A is a cross-sectional view of a multi-element feed array assembly and a Cassegrain reflector assembly, and shows the manner in which a signal is received by the feed array elements.
Figure 1B:
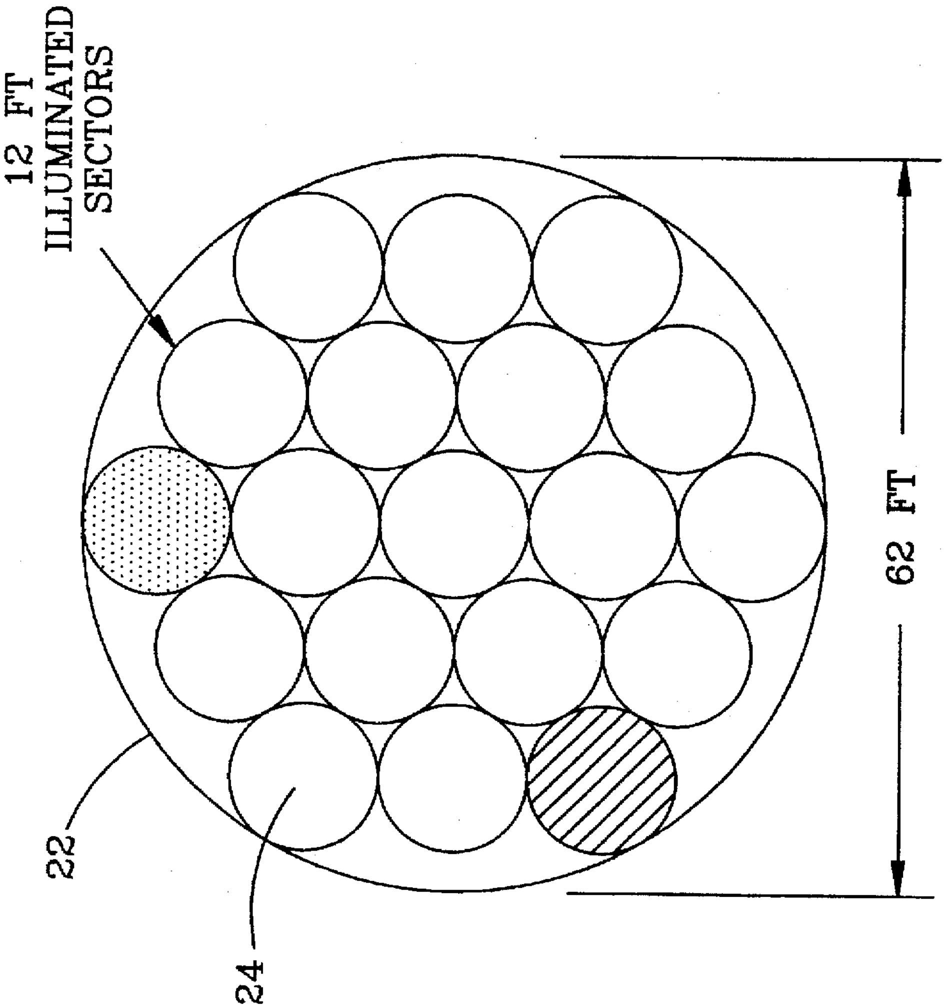
FIG. 1B illustrates the manner in which signals received by an exemplary nineteen-element feed array illuminate a primary reflector assembly of FIG. 1A.
Figure 1C:
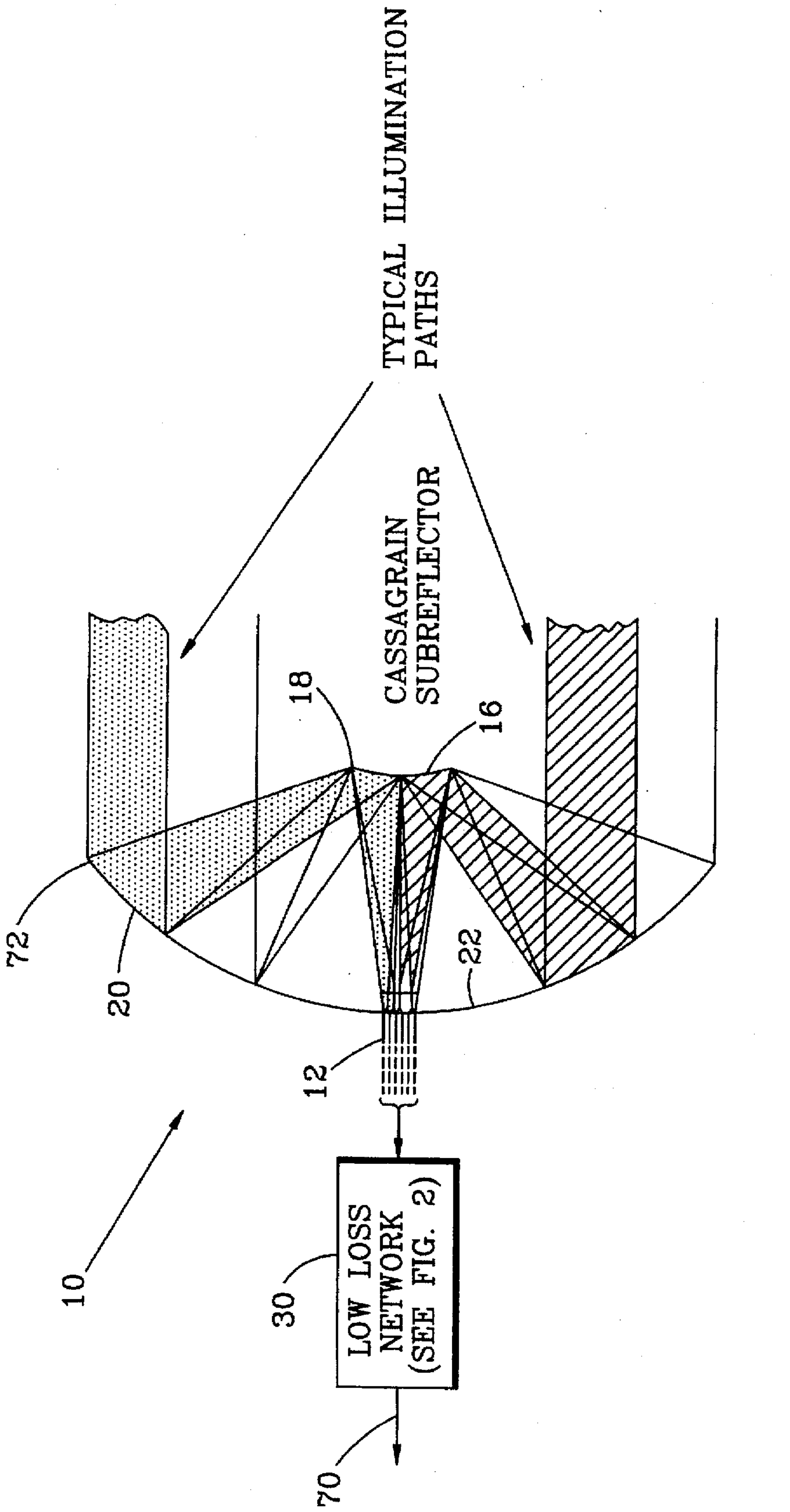
FIG. 1C is a cross-sectional view of a multi-element feed array assembly, a Cassegrain reflector assembly, and a low loss combining network.

An example of a high gain receive antenna system 10 is shown in FIG. 1C. In one embodiment, the antenna system comprises a low loss coherent phase combining network (hereinafter "low loss network") 30 (FIG. 2) used in combination with a Cassegrain reflector assembly 72. Referring also to FIG. 1A, the Cassegrain reflector assembly 72 comprises a primary reflector 20, and a secondary reflector (Cassegrain subreflector) 16 configured in a conventional manner. A multi-element feed array 12, which is used to feed signals received from the secondary reflector 16 and to forward these signals to the low loss network is also shown in FIG. 1A. The multi-element feed array 12 includes a plurality of individual feed array elements 14. The multi-element feed array 12 is positioned in a manner similar to that of a typical single feed element in a Cassegrain reflector configuration. As such, when the antenna system is receiving a signal, the signal reflects from of the primary reflector surface 22, and then from the secondary reflector surface 18, to the multi-element feed array 12.

The use of a multi-element feed array 12 in a Cassegrain reflector configuration, as opposed to the use of a typical single feed element in such a configuration, allows the individual feed array elements 14 to receive signal energy reflected from respective sectors of the primary reflector 20, as will be described below. In a preferred embodiment of the invention, the precision of each of the sectors is high in order to provide for near "aperture-limited" performance.

For purposes of description, the embodiment shown in FIGS. 1A, 1B and 1C, implements a hexagonal packing arrangement in a typical 94 GHz signal frequency application. In this embodiment, it is assumed that surface 22 of the primary reflector 20 has a diameter of approximately 6,000 wavelengths, which in a 94 GHz frequency application is equivalent to approximately 62.4 feet or 19 meters. The area of the surface 22 is approximately 3,894 square feet. In the exemplary 94 GHz application, when a signal is being received by the antenna system 10, the signal illuminates portions, also deemed sectors, 24 of the surface 22 area of the primary reflector 20. Each illuminated portion 24 has an area which is approximately 1/19 of the surface 22 area of the primary reflector 20. Each illuminated portion 24 has a diameter equal to approximately 12 feet, or approximately 1/5 of the 62.4 foot diameter of the primary reflector 20. The total surface 22 area illuminated by the signal portions 24 is known as the effective aperture area (EFA). Based upon the formula defining the gain of the antenna as $$\frac{4\pi}{\lambda^2}(EFA),$$

such dimensions translate to a theoretical signal gain for the antenna system 10 of approximately 355,000,000, or 85.5 dBi. In practice, however, actual antenna gains may be less than theoretical amounts owing to inefficiencies caused by possible gross primary reflector surface. Such misalignments, which may misalignments inherent between illuminated portions of the be caused by, for example, structural gravitational and thermal effects, cause phase error displacements between signals illuminating the respective surface portions. These and other errors are compensated for in a receiving application, by the low loss network 30 as described below.

In the exemplary 94 GHz application, the diameter of the feed array 12 is roughly 50 wavelengths, or 6.4 inches. By example, there are nineteen individual feed array elements 14 comprising the feed array 12.

In the embodiment shown in FIGS. 1A, 1B and 1C, a high theoretical gain of 85.5 dBi is approximated where the ratio of the amount of root mean square (RMS) surface error, of any illuminated portion 24 of the surface 22, to wavelength equals less than 1/20. In the exemplary 94 GHz application, the wavelength equals about 0.127 inches. Thus, in the preferred embodiment the RMS surface error of any illuminated portion of the surface 22 of the primary reflector 20 is less than 0.0064 inches (0.127 inches/20).

As stated previously, during signal reception by the antenna system 10, the received signal illuminates portions 24 (sectors) of the surface 22 of the primary reflector 20, which surface 22 then reflects signal components to the surface 18 of the secondary reflector 16. Each signal component results from the collection of signal flux incident on a respective illuminated portion 24 of the surface 18. The secondary reflector surface 18 reflects each signal component to a corresponding individual feed array element 14 of the multi-element feed array 12. In this manner, a signal received by an individual feed array element 14 indirectly corresponds to a particular illuminated portion 24 of the surface 22 of the primary reflector 20. It should be noted that the sizes of the feed array elements 14 and the size and configuration of the secondary reflector 16 may need to be selected such that individual ones of the illuminated portions 24 correspond to individual ones of the feed array elements 14, and not to more than one feed array element 14. In practice the illuminated portions 24 of the primary reflector surface 22 may overlap to some extent. In a preferred embodiment of the invention, the illuminated portions 24 of the secondary reflector surface 22 are of sufficient precision to provide for the efficient performance of the system 10. Any misalignments between the relative phase center displacements of the illuminated portions 24, which misalignments may be caused by, for example, size and precision limits of the antenna system 10, are compensated for by the low loss network 30, as will be described below.

Figure 2:
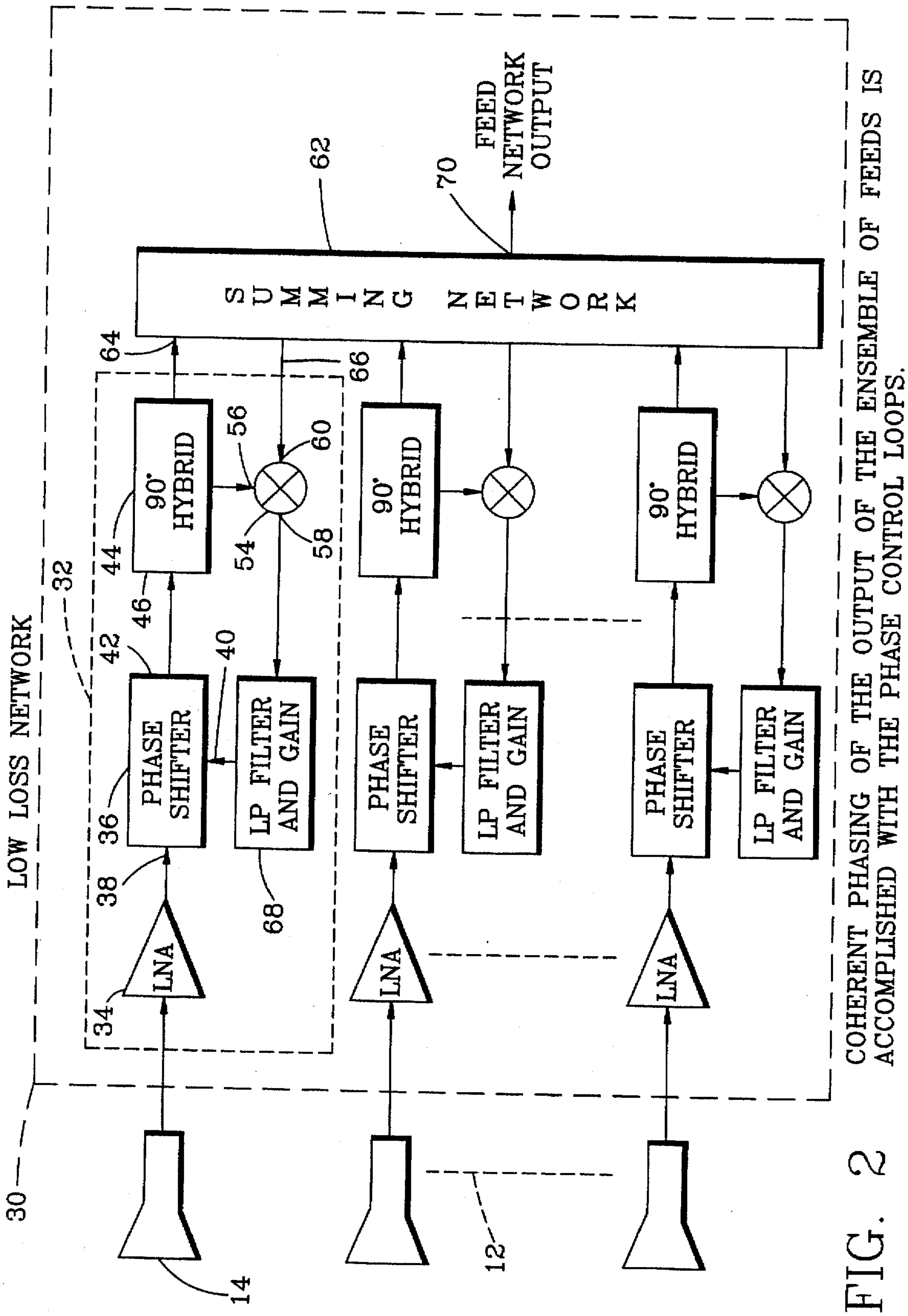
FIG. 2 is a block diagram showing the low loss combining network of FIG. 1C.

After the individual feed array elements 14 receive the individual signal components, the signal components are forwarded to the low loss network 30. As shown in FIG. 2, in the low loss network 30 each output of the individual feed array elements 14 is connected to one of a plurality of constituent signal paths, referred to herein as phase correction loops 32. Each phase correction loop 32 is comprised of a low noise amplifier 34, a phase shifter 36, a 90 degree hybrid coupler 44, a phase detector 54, and a filter and gain device 68. The amplifier 34 is coupled between the output of one of the individual feed array elements 14 and a first input 38 of the phase shifter 36. In the preferred embodiment of this invention, the amplifier 34 is a low noise amplifier designed to provide high gain with small noise. An output 42 of the phase shifter 36 is connected to an input 46 of the 90 degree hybrid coupler 44, which couples the phase shifter output 42 to a first input 56 of the phase detector 54 and also to one of a plurality of inputs 64 of a summing network 62. An output 58 of the phase detector 54 is connected to an input of the filter and gain device 68. The filter and gain device 68 has an output connected to a second input 40 of the phase shifter 36. One of a plurality of secondary outputs 66 of the summing network 62 is connected to a second input 60 of the phase detector 54, wherein each secondary output is equal to a summing network primary output 70. In this manner, a loop configuration is formed by the connections of the phase shifter 36, the 90 degree hybrid coupler 44, the phase detector 54, and the filter and gain device 68. The summing network 62 provides the primary feed network output 70 for input to further circuitry (not illustrated), such as, for example, a down-converter and demodulator.

As stated previously, the low loss network 30 functions to enhance coherent summation of the signals emanating from each of the individual feed array elements 14 of the feed array 12, thus compensating for any actual effective sector phase displacement errors which may occur when signals illuminate the portions 24 of the primary reflector surface 22, and any phase differentials that may exist between signals emanating from the different individual feeds 14 due to path scintillation. As was previously noted, and for purposes of description, the scintillation phenomenon is generally apparent in receiver antennas having an equivalent beamwidth which is of an equal or lesser magnitude than the angle subtended by the scintillation, and/or in antenna systems whose gains exceed approximately 70 dBi. Scintillation causes an apparent displacement in the angle of arrival of a signal while the signal traverses the earth's atmosphere. This angular displacement occurs very rapidly (i.e., within milliseconds) and may cause a "tracking error" to occur for a mechanical receiving antenna system receiving the effected signal. A typical singly-fed parabolic antenna that is mechanically steered, for example, cannot react quickly enough to reposition itself in order to receive the signal at its "angle of arrival" and thus sufficiently compensate for the angular displacement of the signal. When a signal affected by scintillation is received by the antenna system 10 of the present invention, it would be accompanied by phase shifts in the constituent elements of the feed array. The low loss network 30 causes the signals emanating from each of the individual feed array elements 14 to be phase shifted and thus made phase coherent, thereby compensating for this rapid variation of the received signal's apparent "angle of arrival". More specifically, the low loss network 30 coherently sums, or performs a summation of the signals emanating from each of the individual feed array elements 14 after differentially phase shifting the signals to be mutually coherent (i.e., shifting one signal with respect to the other (s)), and provides a composite coherently summed signal to the primary feed network output 70.

When a signal component is forwarded by each of the individual feed array elements 14 to one of the plurality of phase correction loops 32 of the low loss network 30, the signal is amplified by the amplifier 34 and then applied to the phase shifter 36. The phase shifter 36 is an adaptive device which shifts the phase of a signal by an amount proportional to the magnitude of a signal emitted by the phase detector 54 to the second input 40 of the phase shifter 36, as will be described below. When the amplified signal is initially applied to the phase shifter 36, no phase shift occurs as the phase detector 54 has not yet emitted a signal. Note, however, that in actual practice, when a signal portion is initially applied to the phase shifter 36, a random phase shift may occur due to, for example, a possible spurious signal being applied at the second input 40 of the phase shifter 36. A random phase shift, does not have a detrimental effect on the performance of the low loss network 30 in that the network 30 ultimately bootstraps into the operation of performing phase adjustments to provide for a coherent summation, as described below.

After the signal passes through the phase shifter 36, it is applied to two different elements via the 90 degree hybrid coupler 44. The first element to which the signal is applied is the summing network 62. The summing network 62 sums all of the signals received from each individual one of the plurality of phase correction loops 32 and emits a summation signal to the primary feed network output 70, and also to each one of the plurality of secondary outputs 66. The second element to which the signal is applied is the phase detector 54. The phase detector 54 determines the phase difference, if any, existing between a signal received from the phase shifter output 42 and the summation signal received from one of the plurality of secondary outputs 66 of the summing network 62. The phase detector 54 emits a phase correction control signal (hereinafter "phase correction signal") to the filter and gain device 68 when a phase difference is detected. The phase correction signal has a voltage magnitude that is proportional to the detected phase difference. When a phase difference is detected by the phase detector 54, the emitted phase correction signal is applied to the filter and gain device 68 where the signal is bandpass filtered, amplified, and then applied to the second input 40 of the phase shifter 36. The bandpass filtering of the phase correction signal is performed to maximize the signal-to-noise ratio of the correction signal and to limit the dynamic response of the phase correction loops 32. The phase shifter 36 shifts the phase of a signal being received from a respective feed array element 14 and amplifier 34 by an amount proportional to the magnitude of the phase correction signal. This phase-shifted signal then traverses the phase-correction loop 32, passing through the 90 degree hybrid coupler 44, the phase detector 54, the filter and gain device 68, and also the summing network 62 in the same manner as described above for the initial signal. The phase-correction process operates in this closed-loop fashion until the phase detector 54 detects a substantially zero phase difference between a summation and phase-shifted signal. The phase adjustment of the incoming signal continues as referred to to maintain signal coherence with the summation signal. When each of the phase-shifted signals of each of the plurality of phase-correction loops 32 are substantially in phase with a summation signal emanating from each of the plurality of secondary outputs 66 of the summing network 62, the signals are coherently summed by the summing network 62. When this occurs, a signal emanating from the primary feed network output 70 of the summing network 62 is a coherently summed output signal.

This invention may be used to achieve even higher gains if larger reflectors and feed arrays are used with more individual feed array elements. For example, a gain of 90 dBi is achieved by the antenna system with an aperture of approximately two hundred feet and a feed array including approximately two hundred individual feed array elements.

In another embodiment of this invention, the antenna system may be implemented in a three frequency design. For example, a multi-element feed array 12 can be the primary receiver for a 94 GHz signal application, while a conventional single feed element is used for 20 and 40 GHz applications. Known types of frequency selective Cassegrain reflector surfaces may be used to separate energy associated with each particular frequency band in order to physically separate the signal frequency receiver systems.

Figure 3B:
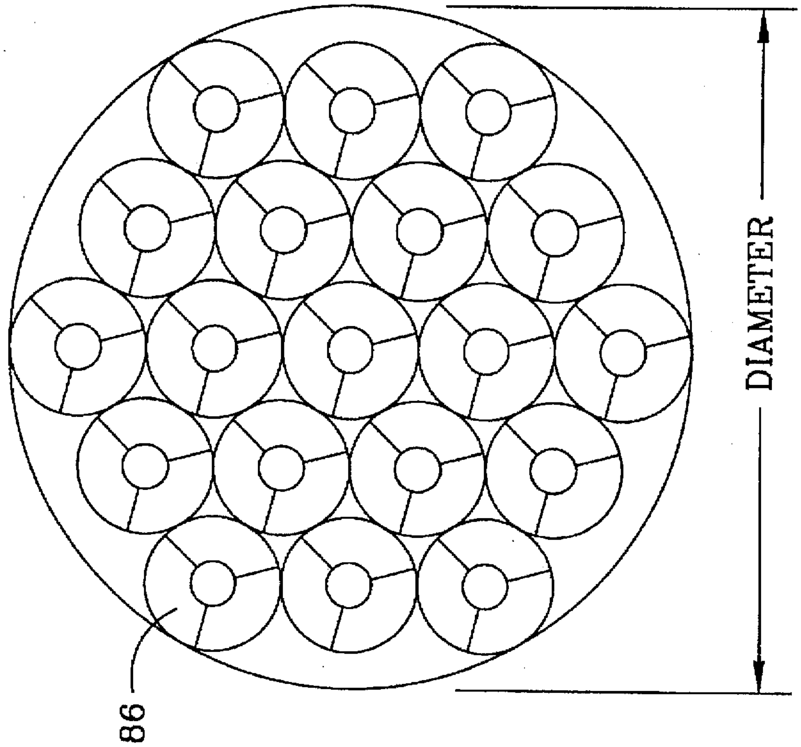
FIG. 3 illustrates an example of one embodiment of the invention. A top view of a plurality of Cassegrain reflector assemblies is shown.
Figure 3A:
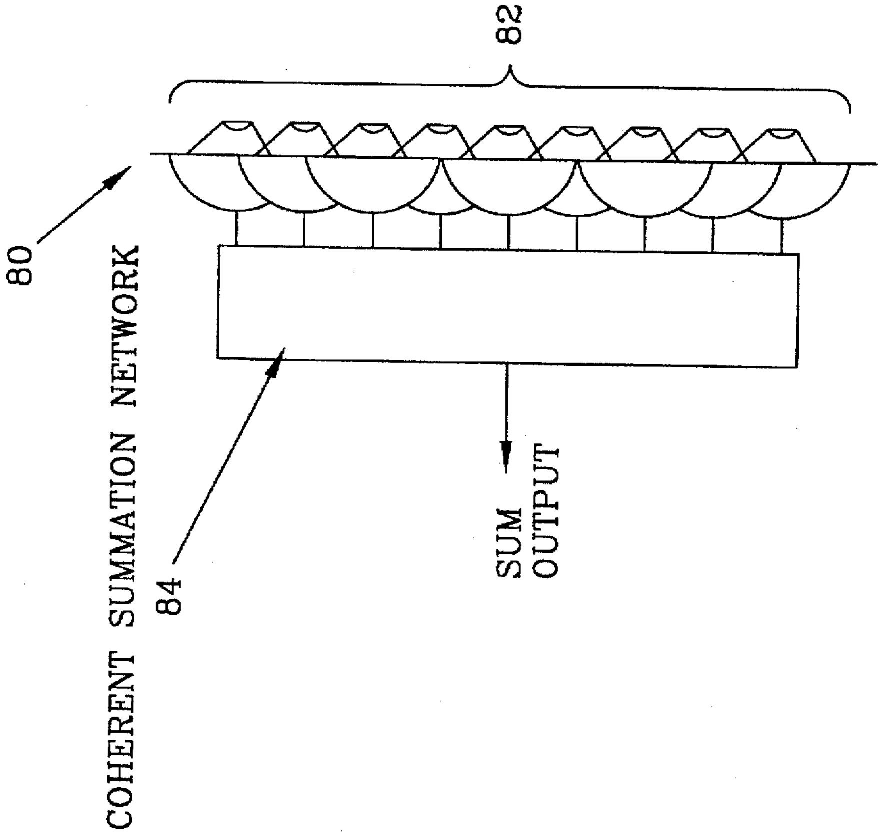

In still another embodiment of this invention, illustrated in FIG. 3, the antenna system 80 is comprised of a plurality of receiving antennas 82 and a coherent summation network 84. In a preferred embodiment of this invention, the plurality of receiving antennas 82 are mounted on a common, nominally co-planar surface (not illustrated). Also in the preferred embodiment, each receiving antenna 82 is a Cassegrain parabolic reflector assembly having high precision and efficiency. The coherent summation network 84 is similar to the low loss network 30 of the embodiment illustrated in FIG. 2.

In practice, when the antennas 82 are mounted on the common, nominally co-planar surface (such configuration being deemed for the purposes of this description as a composite structure) limitations caused by the size of the composite structure may prevent each of the antennas 82 from being aligned to within 1/20 of a wavelength, and the principal axis of each antenna 82 from being aligned to within a small fraction of the beamwidth of the composite antenna structure equivalent beamwidth. Thus, in a preferred embodiment of the invention, each of the antennas 82 is aligned in a manner such that the principal axis of the antenna 82 is parallel to the normal of the co-planar mounting surface to within an error of approximately 1/20 of the beamwidth of the antenna 82.

When a signal is received by the antenna system 80, each receiving antenna 82 receives a portion of the received signal. The signal portions received by the respective antennas 82 are forwarded to the coherent summation network 84, wherein, as in the low loss network 30 of the embodiment shown in FIG. 2, the signal portions are coherently summed.

For purposes of description, the embodiment shown in FIG. 3 illustrates the antenna system 80 with each Cassegrain reflector assembly having a primary reflector 86 with a 12 foot diameter. In an exemplary 100 GHz signal application, a gain of approximately 81 dBi is attained where the Cassegrain reflectors are configured in a manner such that the total approximate diameter of the configuration of reflectors is approximately 60 feet.

Thus, while the invention has been particularly shown and described with respect to preferred embodiments thereof, it will be understood by those skilled in the art that changes in form and details may be made therein without departing from the scope and spirit of the invention.

What is claimed is:

1. A method for increasing the gain of a receiving antenna, comprising the steps of:

receiving an RF signal with a receiving antenna having at least one surface for directing the RF signal to an entrance aperture of the receiving antenna, the entrance aperture being divided into a plurality of sub-apertures, each of the plurality of sub-apertures including a respective feed array element which receives a respective portion of the RF signal;

amplifying the received portions of the RF signal to produce individual amplified signals;

summing the individual amplified signals to produce a summation signal;

determining a phase difference between the summation signal and each individual one of the individual amplified signals;

adjusting a phase of each individual amplified signal by an amount proportional to the determined phase difference to produce individual phase shifted signals, wherein a phase of each individual amplified signal is adjusted to be substantially in phase with the summation signal, thereby increasing the gain of the receiving antenna relative to a gain of a comparably sized antenna having only a single entrance aperture; and summing each of the individual phase shifted signals and providing a substantially coherent summation signal to an output.

2. A method as set forth in claim 1, wherein the receiving antenna includes a Cassegrain reflector assembly.

3. A method for reducing an effect of atmospheric scintillation on a received signal, comprising the steps of:

receiving an RF signal with a receiving antenna having at least one surface for directing the RF signal to an entrance aperture of the receiving antenna, the entrance aperture being divided into a plurality of sub-apertures, each of the plurality of sub-apertures including a respective feed array element which receives a respective portion of the RF signal;

amplifying the received portions of the RF signal to produce individual amplified signals;

summing the individual amplified signals to produce a summation signal;

determining a phase difference between the summation signal and each individual one of the individual amplified signals;

adjusting a phase of each individual amplified signal by an amount proportional to the determined phase difference to produce individual phase shifted signals, wherein a phase of each individual amplified signal is adjusted to be substantially in phase with the summation signal, thereby reducing the effect of atmospheric scintillation on the received RF signal by compensating for an undesired angular displacement of the RF signal resulting from the effect of the atmospheric scintillation on the RF signal; and summing each of the individual phase shifted signals and providing a substantially coherent summation signal to an output.

4. A method as set forth in claim 3, wherein the receiving antenna includes a Cassegrain reflector assembly.

5. An antenna system, comprising:

at least one surface for receiving an RF signal and for directing said received RF signal to an entrance aperture;

a plurality of receiving means located at said entrance aperture, each of said plurality of receiving means receiving a portion of said RF signal; and means for summing together output signals received from each of said plurality of receiving means to generate a composite received signal, wherein each of said plurality of receiving means is comprised of a closed loop phase adjustment means for minimizing a phase shift between a respective portion of said RF signal and said composite received signal so as to compensate for at least one of an undesired angular displacement of the RF signal resulting from an effect of atmospheric scintillation on the RF signal and any misalignments between illuminated portions of the at least one surface, and also to increase the gain of the antenna system relative to a gain of a comparably sized antenna having only a single entrance aperture.

6. An antenna system as set forth in claim 5, wherein said at least one surface for receiving an RF signal and for directing said received RF signal to an entrance aperture is a portion of a Cassegrain reflector assembly.

7. An antenna system as set forth in claim 5, wherein each said closed loop phase adjustment means further comprises:

phase detecting means, for detecting a phase shift between a respective portion of said RF signal and said composite received signal;

phase adjusting means for adjusting a phase of a respective portion of said RF signal by an amount that is proportional to the magnitude of a phase shift detected by said detecting means, for minimizing a phase shift between a respective portion of said RF signal and said composite received signal.

8. An antenna system comprising:

a plurality of receiving means for receiving an RF signal, each of said plurality of receiving means receiving a portion of said RF signal, wherein each of said plurality of receiving means includes at least one surface of a Cassegrain reflector assembly; and means for summing together output signals received from each of said plurality of receiving means to generate a composite received signal, wherein each of said plurality of receiving means is comprised of a closed loop phase adjustment means for minimizing a phase shift between a respective portion of said RF signal and said composite received signal.

9. An antenna system as set forth in claim 8, wherein the plurality of receiving means are mounted on a common, nominally co-planar surface.

10. An antenna system as set forth in claim 9, wherein each receiving means is an antenna having an associated axis and a characteristic beamwidth, and wherein each antenna is aligned in a manner such that its associated axis is substantially perpendicular to said co-planar surface.

11. An antenna system as set forth in claim 10, wherein each antenna is aligned in a manner such that its associated axis is substantially perpendicular to said co-planar surface to within an error of 1/20 of the characteristic beamwidth of the antenna.

12. A method for increasing the gain of a receiving antenna system, comprising the steps of:

receiving an RF signal with a plurality of Cassegrain receiving antennas of the receiving antenna system, each of the plurality of Cassegrain receiving antennas receiving a portion of the RF signal;

reflecting each received portion of the RF signal from at least one surface of a respective one of the plurality of Cassegrain receiving antennas to produce a corresponding individual amplified signal;

summing each individual amplified signal to produce a summation signal;

determining a phase difference between the summation signal and each individual one of the amplified signals;

adjusting a phase of each individual amplified signal by an amount proportional to the determined phase difference to produce individual phase shifted signals, wherein a phase of each individual amplified signal is adjusted to be substantially in phase with the summation signal, thereby increasing the gain of the receiving antenna system relative to a gain of a comparably sized antenna having only a single entrance aperture; and summing each of the individual phase shifted signals and providing a substantially coherent summation signal to an output.

13. A method for reducing an effect of atmospheric scintillation on a received signal, comprising the steps of:

receiving an RF signal with a plurality of Cassegrain receiving antennas of the receiving antenna system, each of the plurality of receiving antennas receiving a portion of the RF signal;

reflecting each received portion of the RF signal from at least one surface of a respective one of the plurality of Cassegrain receiving antennas to produce a corresponding individual amplified signal;

summing each individual amplified signal to produce a summation signal;

determining a phase difference between the summation signal and each individual one of the amplified signals;

adjusting a phase of each individual amplified signal by an amount proportional to the determined phase difference to produce individual phase shifted signals, wherein a phase of each individual amplified signal is adjusted to be substantially in phase with the summation signal, thereby reducing the effect of atmospheric scintillation on the received RF signal by compensating for an undesired angular displacement of the RF signal resulting from the effect of the atmospheric scintillation on the RF signal; and summing each of the individual phase shifted signals and providing a substantially coherent summation signal to an output.

* * * * *